(12) United States Patent
Silverbrook

(10) Patent No.: US 7,241,005 B2
(45) Date of Patent: Jul. 10, 2007

(54) MOBILE PHONE WITH SWIPE PRINTER

(75) Inventor: Kia Silverbrook, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 229 days.

(21) Appl. No.: 10/503,924

(22) PCT Filed: Feb. 12, 2003

(86) PCT No.: PCT/AU03/00169

§ 371 (c)(1),
(2), (4) Date: Aug. 9, 2004

(87) PCT Pub. No.: WO03/069882

PCT Pub. Date: Aug. 21, 2003

(65) Prior Publication Data
US 2005/0145700 A1    Jul. 7, 2005

(30) Foreign Application Priority Data
Feb. 13, 2002   (AU) ................................. PS 0491

(51) Int. Cl.
*B41J 3/36* (2006.01)

(52) U.S. Cl. ........................... 347/109; 400/88; 400/76

(58) Field of Classification Search ................ 347/109; 400/88, 76
See application file for complete search history.

(56) References Cited

U.S. PATENT DOCUMENTS

| 5,208,446 | A |   | 5/1993  | Martinez |           |
|-----------|---|---|---------|----------|-----------|
| 5,475,403 | A | * | 12/1995 | Havlovick et al. | 705/33 |
| 5,988,900 | A | * | 11/1999 | Bobry    | 400/88    |

FOREIGN PATENT DOCUMENTS

| DE | 4444295    | A | 6/1996 |
| GB | 2287623    | A | 9/1995 |
| JP | 2002-016679|   | 1/2002 |
| WO | WO 01/41480| A | 6/2001 |

* cited by examiner

Primary Examiner—Stephen Meier
Assistant Examiner—Ly T. Tran

(57) ABSTRACT

A mobile telecommunications device, such as a mobile telephone, includes an internal printer for printing on print media external to the device. A speed sensor measures the speed at which a user moves the device relative to the print media and controls the rate of ink ejection accordingly. The device may print images displayed on a display screen of the device or may print image data received through a wireless telecommunications network.

8 Claims, 10 Drawing Sheets

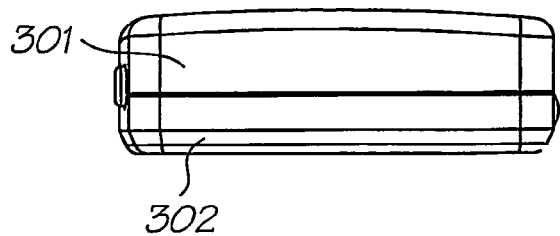
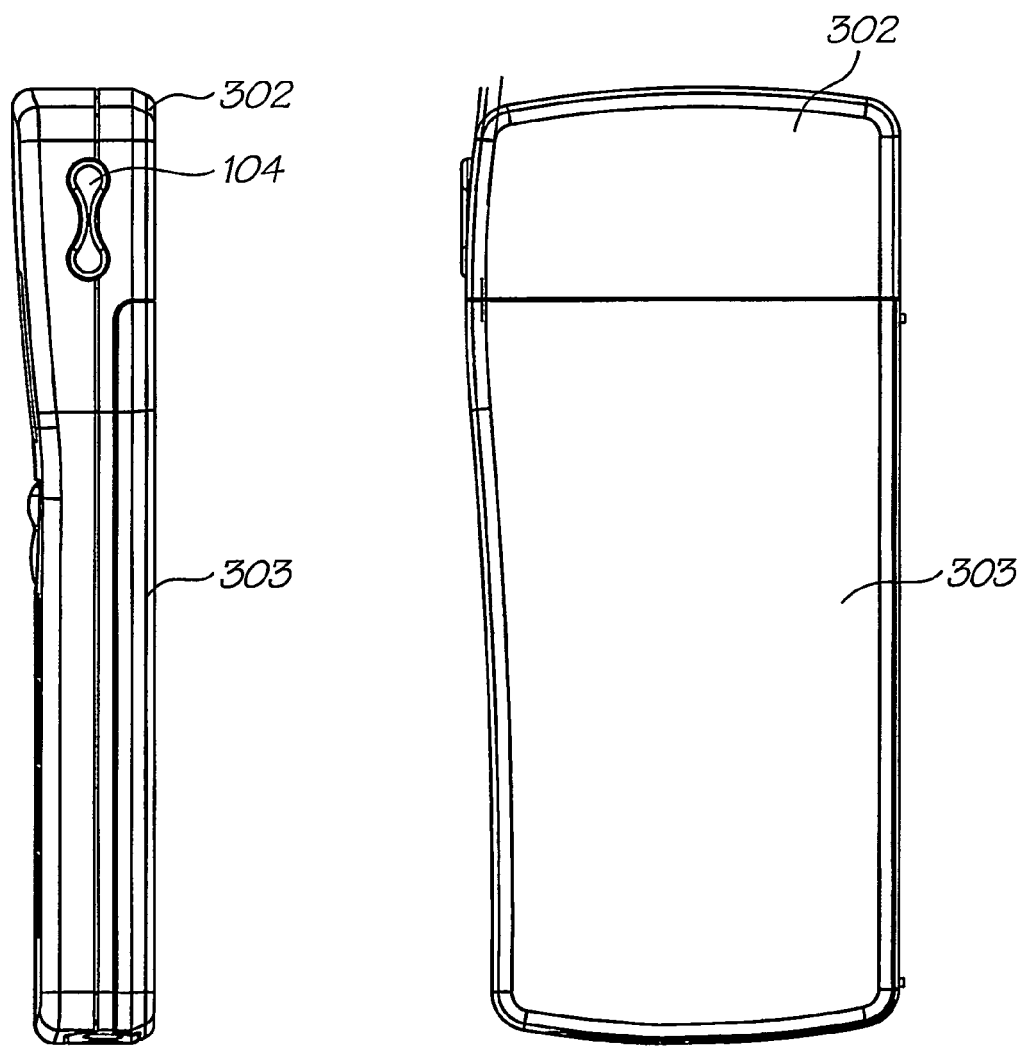
FIG. 11
FIG. 9  FIG. 10

MOBILE PHONE WITH SWIPE PRINTER

The present application is a 371 of PCT/AU03/00169 filed on Feb. 12, 2003.

FIELD OF THE INVENTION

This invention relates to mobile telecommunications devices, in particular mobile telephones, and peripheral devices giving current mobile telephones greater functionality. Specifically, the present invention relates to mobile telephones having an internal colour printer.

BACKGROUND

In recent years, the commercially successful models of mobile telephones have been the ones which have been the most compact. The desire for small size has prevented other devices, most notably printers, from being incorporated into the housings of mobile telephones.

Prior art printers incorporate a supply of print media into the printer and employ a print media feed mechanism to transport the print media past the printhead(s) to effect printing onto the print media. It is essential during a printing operation to synchronise the speed of the print media with the printing rate of the printhead(s) to ensure a faithful reproduction of the image being printed. Heretofore, the synchronisation of the print media with the printhead(s) has been relatively simple to accomplish because the print media feed mechanism, including the supply of print media, forms an integral part of the printer. The speed of the print media is therefore known and fixed, as is the speed at which the printhead(s) and print controller operate, with synchronisation between these features being accomplished using simple mechanical features such as gears, stepper motors and the like.

Such features however, in particular the need to have a supply of print media accommodated within the printer, have made these printers larger and heavier than they otherwise need be. Even in more compact printers employing a monolithic page-width drop-on-demand printhead arrangement of the type described in the above mentioned co-pending applications, where the printhead is fixed, there is still a need to have a supply of print media and a print media drive mechanism integral to the printer to ensure proper synchronisation between ink ejection and the motion of the print media. Up until now these requirements have limited the minimum possible printer size and have precluded the possibility of a printer being incorporated into a device such as a compact mobile telephone.

CO-PENDING APPLICATIONS

| | | |
|---|---|---|
| PCT/AU03/00150 | PCT/AU03/00154 | PCT/AU03/00151 |
| PCT/AU03/00152 | PCT/AU03/00145 | PCT/AU03/00153 |
| PCT/AU03/00170 | PCT/AU03/00168 | PCT/AU03/00169 |
| PCT/AU03/00146 | PCT/AU03/00159 | PCT/AU03/00162 |
| PCT/AU03/00149 | PCT/AU03/00167 | PCT/AU03/00171 |
| PCT/AU03/00147 | PCT/AU03/00166 | PCT/AU03/00158 |
| PCT/AU03/00163 | PCT/AU03/00165 | PCT/AU03/00164 |
| PCT/AU03/00157 | PCT/AU03/00148 | PCT/AU03/00160 |
| PCT/AU03/00155 | | PCT/AU03/00156 |

RELATED PATENT APPLICATIONS AND PATENTS

| | | | |
|---|---|---|---|
| U.S. Pat. No. 6,227,652 | U.S. Pat. No. 6,213,588 | U.S. Pat. No. 6,213,589 | U.S. Pat. No. 6,231,163 |
| U.S. Pat. No. 6,247,795 | U.S. Pat. No. 6,394,581 | U.S. Pat. No. 6,244,691 | U.S. Pat. No. 6,257,704 |
| U.S. Pat. No. 6,416,168 | U.S. Pat. No. 6,220,694 | U.S. Pat. No. 6,257,705 | U.S. Pat. No. 6,247,794 |
| U.S. Pat. No. 6,234,610 | U.S. Pat. No. 6,247,793 | U.S. Pat. No. 6,264,306 | U.S. Pat. No. 6,241,342 |
| U.S. Pat. No. 6,247,792 | U.S. Pat. No. 6,264,307 | U.S. Pat. No. 6,254,220 | U.S. Pat. No. 6,234,611 |
| U.S. Pat. No. 6,302,528 | U.S. Pat. No. 6,283,582 | U.S. Pat. No. 6,239,821 | U.S. Pat. No. 6,338,547 |
| U.S. Pat. No. 6,247,796 | US09/113,122 | U.S. Pat. No. 6,390,603 | U.S. Pat. No. 6,362,843 |
| U.S. Pat. No. 6,293,653 | U.S. Pat. No. 6,312,107 | U.S. Pat. No. 6,227,653 | U.S. Pat. No. 6,234,609 |
| U.S. Pat. No. 6,238,040 | U.S. Pat. No. 6,188,415 | U.S. Pat. No. 6,227,654 | U.S. Pat. No. 6,209,989 |
| U.S. Pat. No. 6,247,791 | U.S. Pat. No. 6,336,710 | U.S. Pat. No. 6,217,153 | U.S. Pat. No. 6,416,167 |
| U.S. Pat. No. 6,243,113 | U.S. Pat. No. 6,283,581 | U.S. Pat. No. 6,247,790 | U.S. Pat. No. 6,260,953 |
| U.S. Pat. No. 6,267,469 | U.S. Pat. No. 6,273,544 | U.S. Pat. No. 6,309,048 | U.S. Pat. No. 6,420,196 |
| U.S. Pat. No. 6,443,558 | US09/422,892 | U.S. Pat. No. 6,378,989 | US09/425,420 |
| US09/422,893 | US09/609,140 | U.S. Pat. No. 6,409,323 | U.S. Pat. No. 6,281,912 |
| US09/575,113 | U.S. Pat. No. 6,318,920 | U.S. Pat. No. 6,488,422 | US09/693,644 |
| U.S. Pat. No. 6,457,810 | U.S. Pat. No. 6,485,135 | US09/112,763 | U.S. Pat. No. 6,331,946 |
| U.S. Pat. No. 6,246,970 | U.S. Pat. No. 6,442,525 | US09/505,951 | US09/505,147 |
| US09/505,952 | US09/575,108 | US09/575,109 | US09/575,110 |
| US09/607,985 | U.S. Pat. No. 6,398,332 | U.S. Pat. No. 6,394,573 | US09/606,999 |
| U.S. Pat. No. 6,238,044 | U.S. Pat. No. 6,425,661 | U.S. Pat. No. 6,390,605 | U.S. Pat. No. 6,322,195 |
| US09/504,221 | U.S. Pat. No. 6,480,089 | U.S. Pat. No. 6,460,778 | U.S. Pat. No. 6,305,788 |
| U.S. Pat. No. 6,426,014 | U.S. Pat. No. 6,364,453 | U.S. Pat. No. 6,457,795 | US09/556,219 |
| US09/556,218 | U.S. Pat. No. 6,315,399 | U.S. Pat. No. 6,338,548 | US09/575,190 |
| U.S. Pat. No. 6,328,431 | U.S. Pat. No. 6,328,425 | US09/575,127 | U.S. Pat. No. 6,383,833 |
| U.S. Pat. No. 6,464,332 | U.S. Pat. No. 6,390,591 | US09/575,152 | U.S. Pat. No. 6,328,417 |
| U.S. Pat. No. 6,322,194 | US09/575,177 | US09/575,175 | U.S. Pat. No. 6,417,757 |
| US09/608,780 | U.S. Pat. No. 6,428,139 | US09/607,498 | US09/693,079 |
| US09/693,135 | U.S. Pat. No. 6,428,142 | US09/692,813 | US09/693,319 |
| US09/693,311 | U.S. Pat. No. 6,439,908 | US09/693,735 | PCT/AU98/00550 |
| PCT/AU00/00516 | PCT/AU00/00517 | PCT/AU00/00511 | PCT/AU00/00754 |
| PCT/AU00/00755 | PCT/AU00/00756 | PCT/AU00/00757 | PCT/AU00/00095 |
| PCT/AU00/00172 | PCT/AU00/00338 | PCT/AU00/00339 | PCT/AU00/00340 |
| PCT/AU00/00341 | PCT/AU00/00581 | PCT/AU00/00580 | PCT/AU00/00582 |
| PCT/AU00/00587 | PCT/AU00/00588 | PCT/AU00/00589 | PCT/AU00/00583 |
| PCT/AU00/00593 | PCT/AU00/00590 | PCT/AU00/00591 | PCT/AU00/00592 |

-continued

RELATED PATENT APPLICATIONS AND PATENTS

| PCT/AU00/00584 | PCT/AU00/00585 | PCT/AU00/00586 | PCT/AU00/00749 |
|---|---|---|---|
| PCT/AU00/00750 | PCT/AU00/00751 | PCT/AU00/00752 | PCT/AU01/01332 |
| PCT/AU01/01318 | PCT/AU00/01513 | PCT/AU00/01514 | PCT/AU00/01515 |
| PCT/AU00/01516 | PCT/AU00/01517 | PCT/AU00/01512 | PCT/AU01/00502 |
| PCT/AU00/01120 | PCT/AU00/00333 | PCT/AU01/00141 | PCT/AU01/00139 |
| PCT/AU01/00140 | PCT/AU00/00753 | PCT/AU01/01321 | PCT/AU01/01322 |
| PCT/AU01/01323 | PCT/AU00/00594 | PCT/AU00/00595 | PCT/AU00/00596 |
| PCT/AU00/00597 | PCT/AU00/00598 | PCT/AU00/00741 | PCT/AU00/00742 |

SUMMARY OF THE INVENTION

According to one aspect of the present invention there is provided a mobile telecommunications device comprising a casing, a display, circuitry for wireless telecommunications housed within the casing and a printer housed within the casing, the printer comprising:

a printhead arrangement adapted to effect printing onto print media as the printer is moved relative to the print media, the printhead arrangement including a plurality of ink ejection nozzles;

an ink supply adapted to store ink and to supply the ink to the printhead arrangement;

a speed sensor adapted to measure the speed at which the printhead arrangement is moved relative to the print media and to generate speed data; and a print controller adapted to:
  (a) receive image data from an image source;
  (b) convert the image data into a plurality of drop ejection control signals;
  (c) receive the speed data from the speed sensor, and
  (d) operate the ink ejection nozzles in the printhead arrangement in accordance with the drop ejection control signals at a rate determined using the speed data, to thereby effect printing of the image data onto the print media.

Preferably, the speed sensor comprises:

an optical encoder wheel adapted to be in contact with the print media and to rotate as the device is moved relative to the print media, the optical encoder wheel having a series of circumferentially spaced markings thereon; and an optical sensor adapted to:
  (a) detect the markings as the markings pass the optical sensor during rotation of the optical encoder wheel; and
  (b) generate the speed data from the detected markings.

Preferably, the ink supply is removable from the printer.

Preferably, the device further comprises a capping arrangement moveable between a capped position in which the capping arrangement substantially obstructs the ejection of ink from the ink ejection nozzles and an un-capped position in which the capping arrangement does not substantially obstruct the ejection of ink from the ink ejection nozzles.

Preferably, the device further comprises a capping actuator disposed on the device so as to be operable by a user as the user moves the printhead arrangement relative to the print media.

Preferably, the device further comprises a biasing member adapted to bias the capping arrangement towards the capped position.

Preferably, the print controller receives the image data from the image source via the circuitry for wireless telecommunications. More preferably, the image data is received at the circuitry for wireless telecommunications from a wireless telecommunications network.

Preferably, the device further comprises a memory adapted to store the image data.

Preferably, the image to be printed is displayed on the device display.

Preferably, the printer further comprises a replaceable ink cartridge.

Preferably, the device further comprises one or more ink inlets through which the ink supply may be replenished.

Preferably, the device further comprises a digital camera including a lens and CCD array, and wherein image data captured by the CCD array is displayed on the display of the telecommunications device.

Preferably, the printer is adapted to print images captured by the digital camera.

BRIEF DESCRIPTION OF THE DRAWINGS

The invention will now be described by way of example only with reference to preferred embodiments and to the accompanying drawings in which:

FIG. 9 is a side elevational view of the mobile telephone of FIG. 5;

FIG. 10 is a rear elevational view of the mobile telephone of FIG. 5;

FIG. 11 is a plan view of the mobile telephone of FIG. 5; and

DESCRIPTION OF PREFERRED EMBODIMENTS

Figure 1:
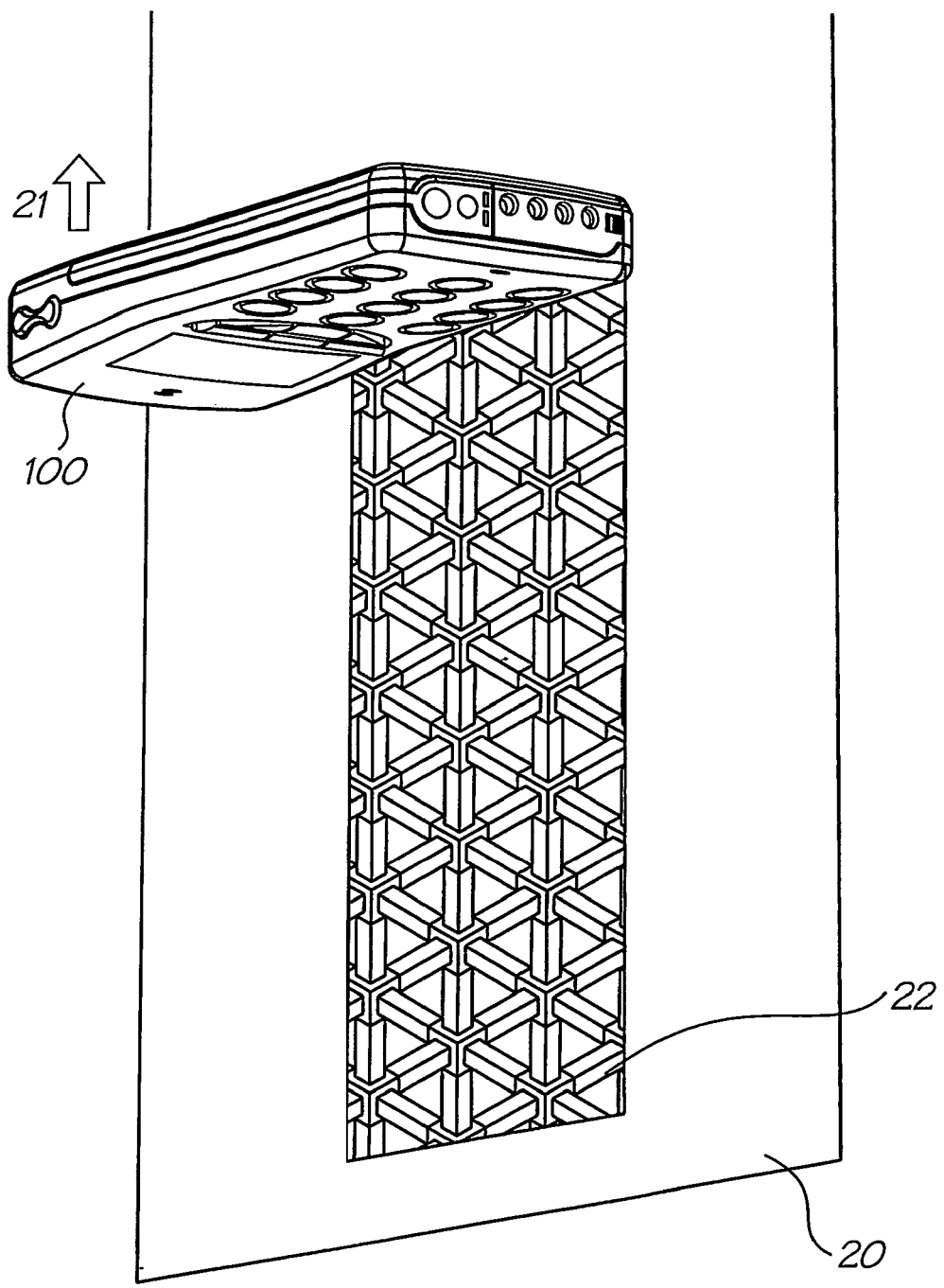
FIG. 1 shows a perspective view of a mobile telecommunications device with an in-built printer in use, printing an image onto a page of print media.

Referring to FIG. 1, a mobile telecommunications device according to the present invention is shown generally at 100. The telecommunications device 100 is a mobile telephone having an internal printer and is depicted in FIG. 1 as moving, under the guidance of a user (not shown), across a page 20 of print media in the direction of the arrow 21 to print an image 22 on the page 20.

Figure 5:
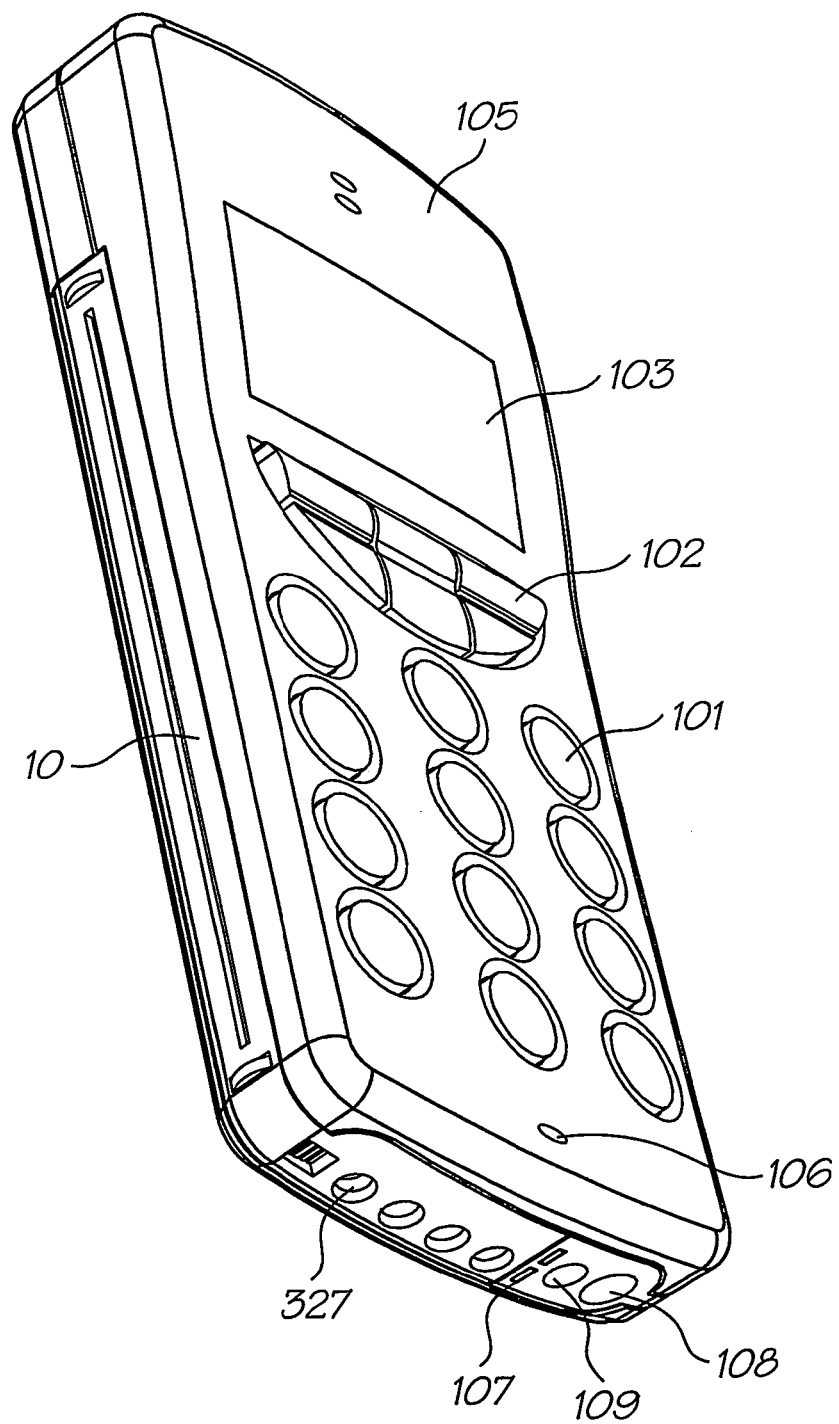
FIG. 5 is a front perspective view of a mobile telephone having an internal printer.
Figure 6:
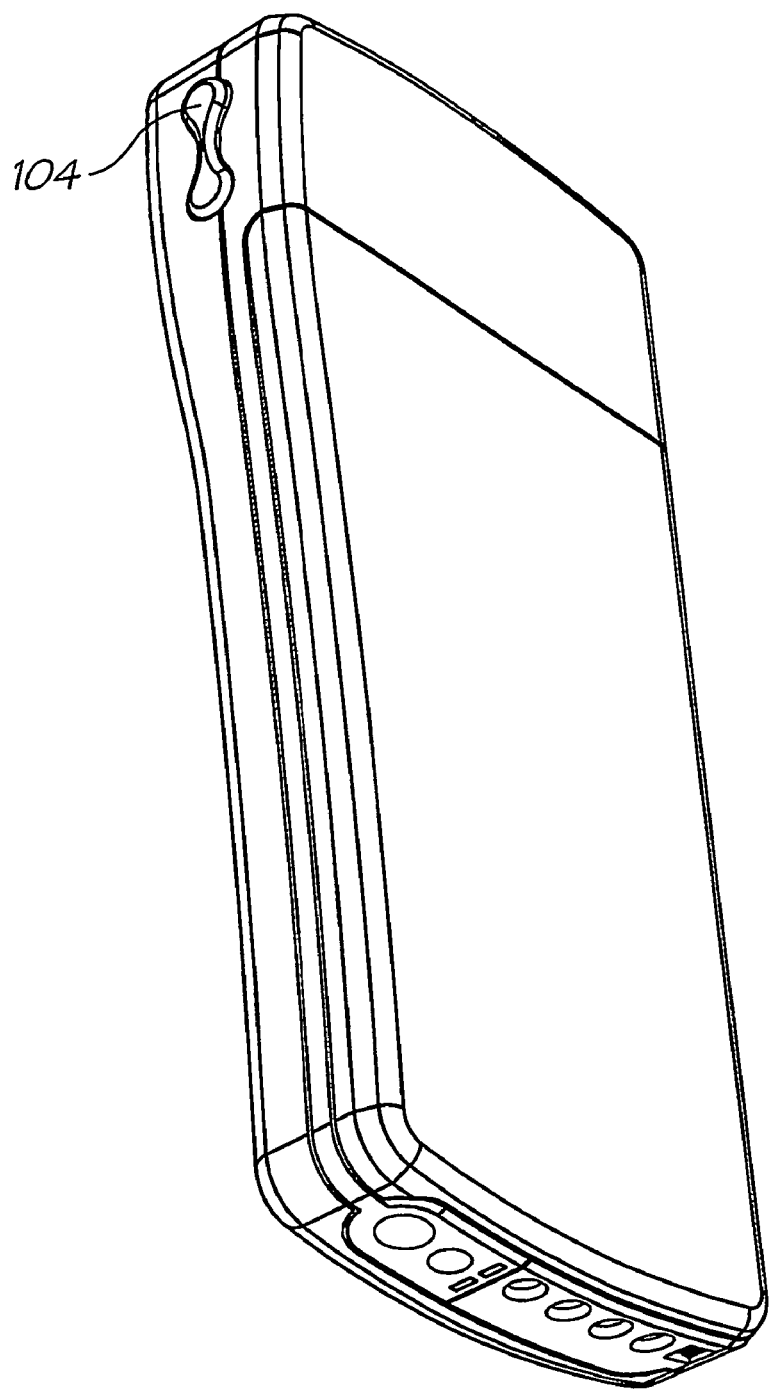
FIG. 6 is a rear perspective of the mobile telephone.

With reference to FIGS. 5 and 6, the mobile telephone 100 includes standard features such as a keypad 101, navigation keys 102, display screen 103, volume buttons 104, speaker 105 and microphone 106. The telephone also includes charging contacts 107, power socket 108 and hands free jack 109. A printer unit 10 is received through an opening in the side of the telephone casing.

Figure 7:
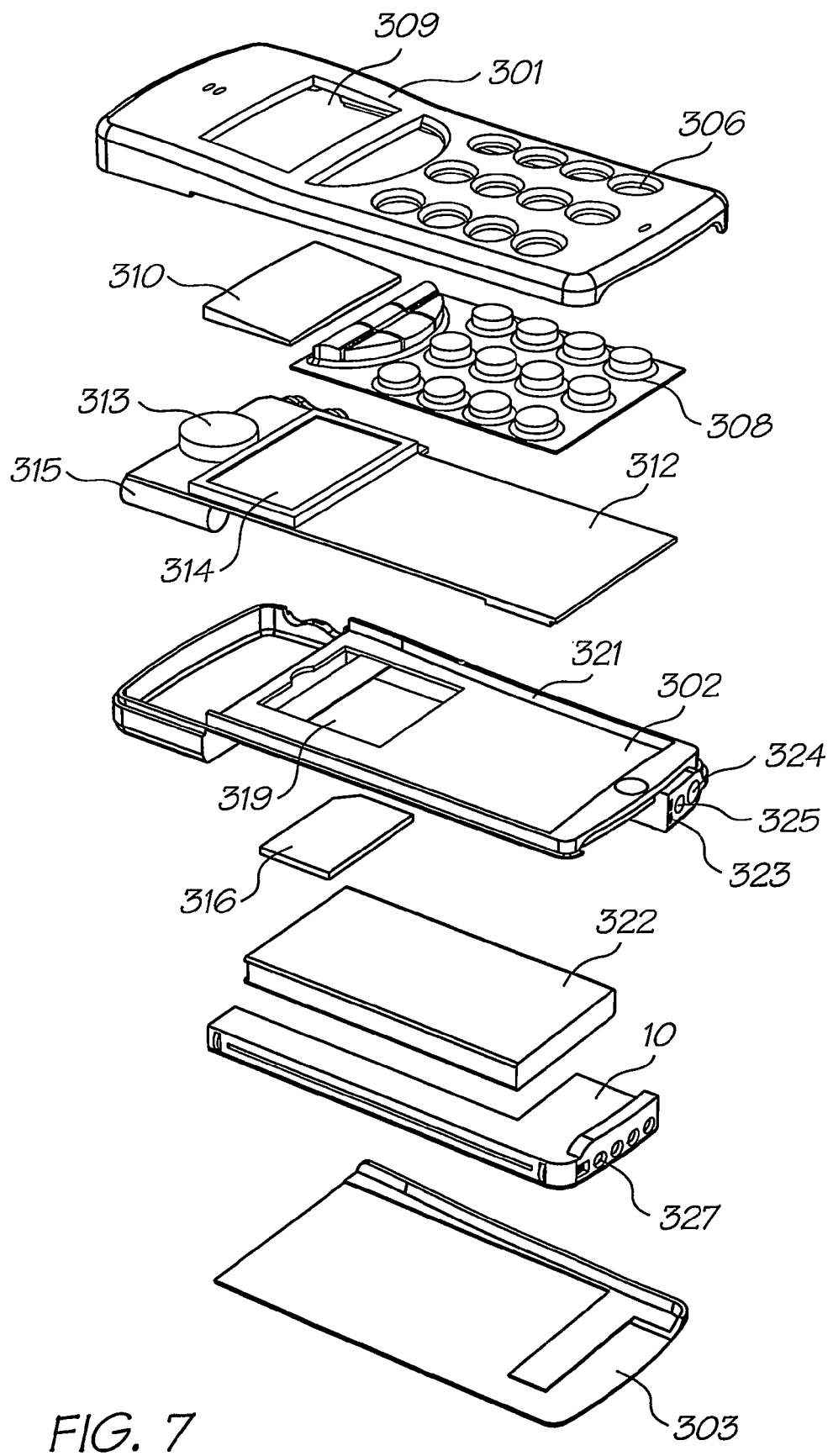
FIG. 7 is an exploded perspective view of the mobile telephone.

An exploded view of the telephone 100 is illustrated in FIG. 7. Assembled views are shown in FIGS. 8 to 11. With reference to these figures, the telephone includes an upper moulding 301, base moulding 302 and cover moulding 303. The upper moulding 301 has a first series of apertures 306 that receive keypad and navigation keys from an elastomeric keypad 308. A second aperture 309 receives a lens moulding 310.

A rigid printed circuit board (PCB) 312 is held firmly between the upper moulding 301 and base moulding 302. As is known, the PCB 312 contains the majority of the telephone circuitry, in particular a speaker 313, colour LCD display 314 and an aerial 315. A SIM card 316 containing ID codes and command circuitry as is known in the art is received in an internal aperture 319 in the base moulding 302 and electrically communicates with the PCB 312 in a known manner.

The base moulding 302 has a recess 321 in its upper surface that receives the PCB 312 and aerial 315. A cut-away section is provided in the lower portion of the base moulding 302 to receive a standard mobile telephone battery 322 and the printer unit 10, further details of which are described below.

The base moulding 302 further includes charging contact apertures 323, power socket aperture 324 and hands free jack aperture 325.

The cover moulding 303 removably fits with the base moulding 302 to provide an access to the battery 322 and SIM card 316.

Figure 3:
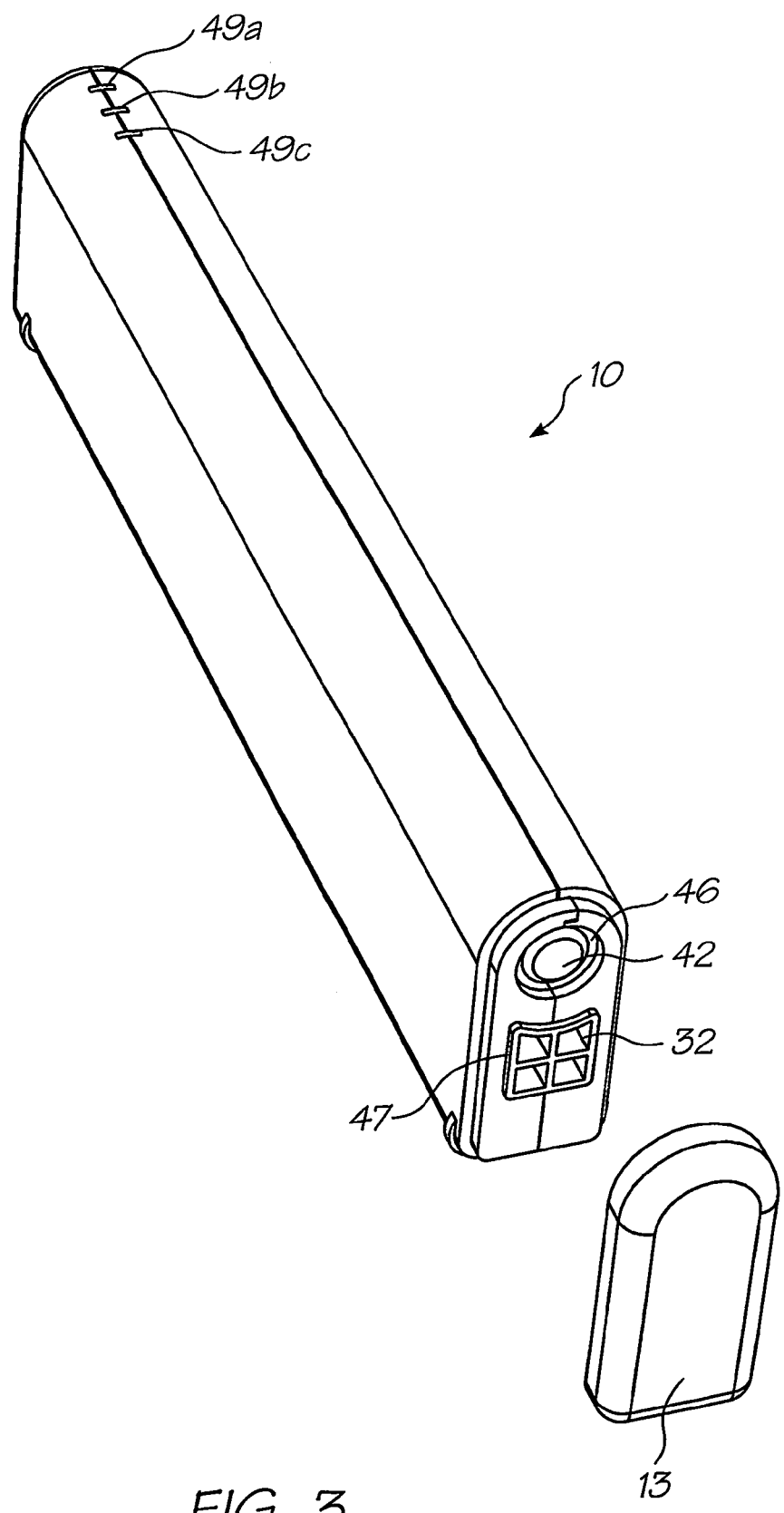
FIG. 3 is a top perspective view of the printer.
Figure 4:
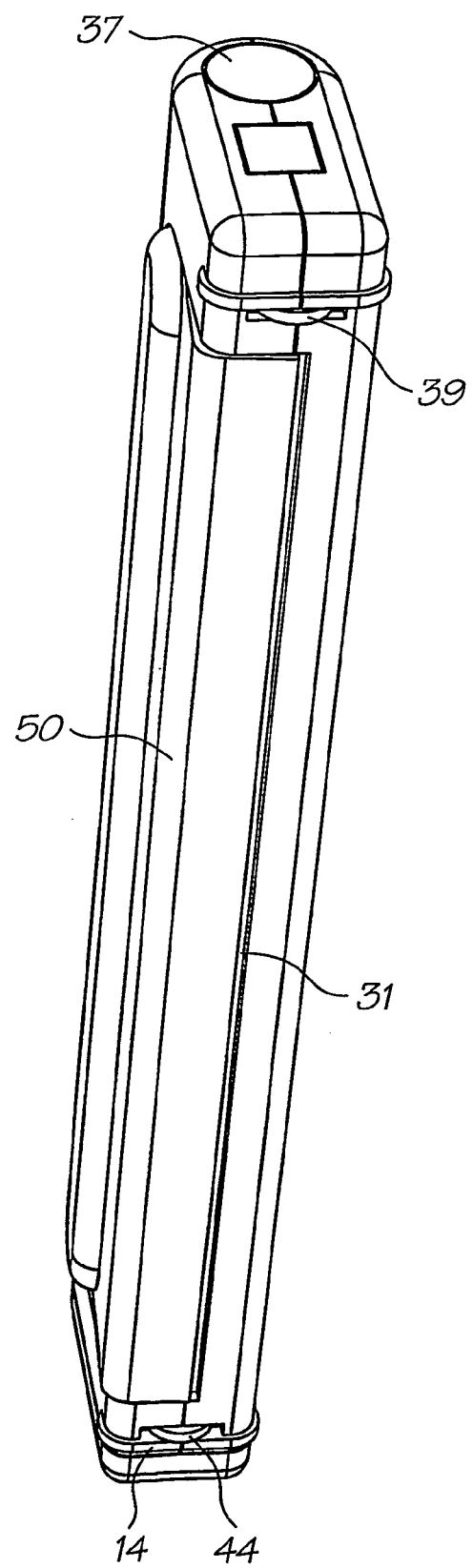
FIG. 4 is an underside perspective of the printer.

Details of the printer unit 10 will now be described with reference to FIGS. 2 to 4. Although FIGS. 2 to 4 depict a stand-alone swipe printer, having a slightly different shape from the printer depicted in FIG. 7, those skilled in the art will appreciate that many of the features of the two printers are common and need not be described with specific reference to this mobile telecommunications device version of the printer.

Figure 2:
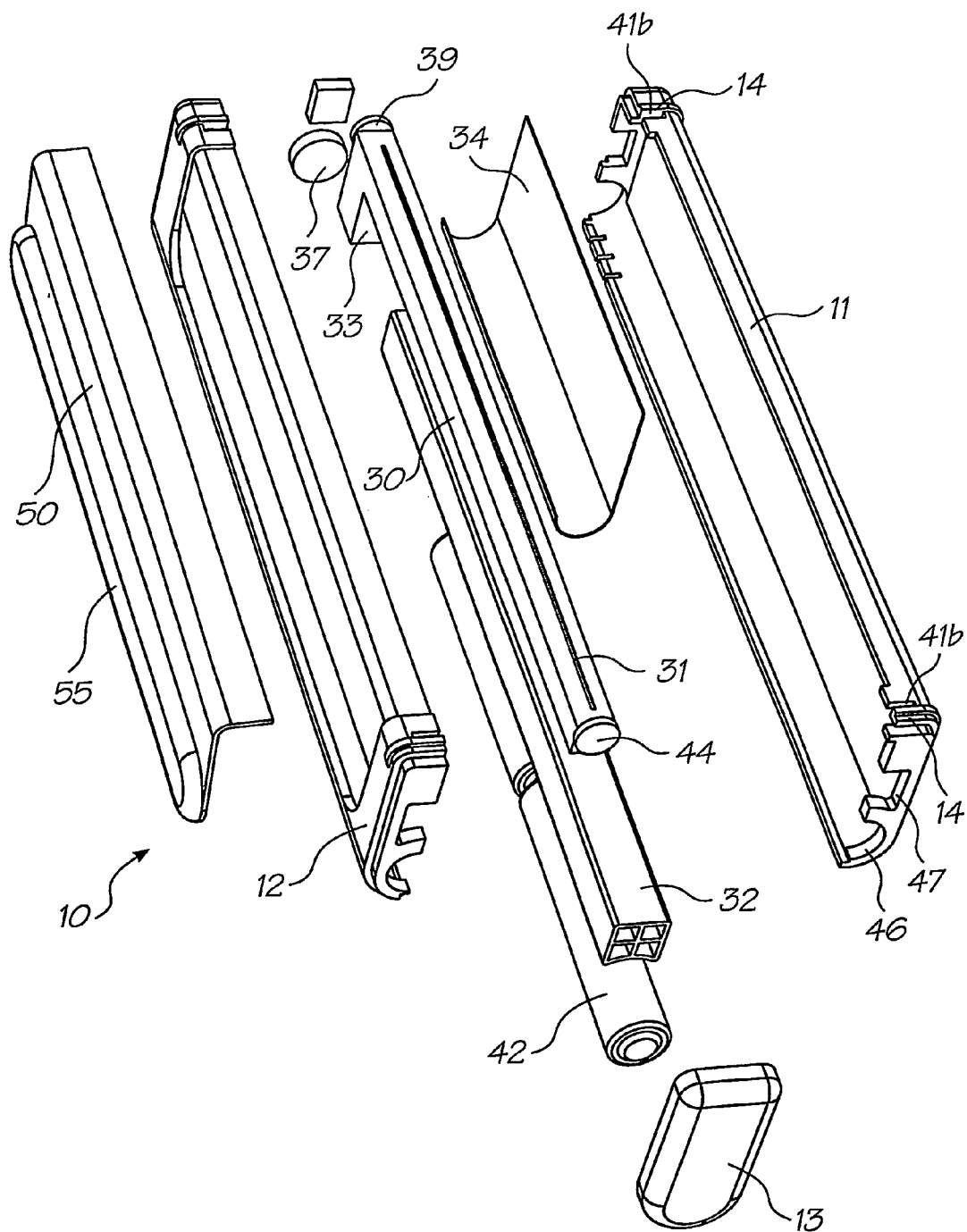
FIG. 2 is an exploded perspective view of a printer used in the mobile telecommunications device.

An exploded view of the printer 10 is shown in FIG. 2. The printer 10 includes a lower moulding 11, upper moulding 12 and removable end cap 13 each of which may be formed of any suitable plastics, metal or similar material.

The upper and lower mouldings each include media slides 14 formed at each end of the mouldings on the bottom surface thereof. The slides 14 protrude from the bottom surface of the mouldings and serve to elevate the printer as the printer traverses the print media resulting in minimal friction between the printhead and print media and preventing contact between the printer and freshly printed ink which could otherwise disturb the printed image.

When joined, the upper and lower mouldings reveal an ink ejection slot through which ink is ejected during printing. A capping device 50, preferably of metal is received in a recess 17 formed in the upper moulding 12. The capping device 50, moves from a position in which a capping arm 52 of the capper 50 blocks the ink ejection slot 15 to a position where ink ejection is unrestricted.

Internally, the printer 10 includes a printhead module 30 in which is disposed a plurality of ink distribution channels leading to an array of ink ejection nozzles 31 aligned with the ink ejection slot 15 formed between the upper and lower mouldings 12, 11. An ink supply cartridge 32 stores coloured inks, preferably in four colours namely cyan, magenta, yellow and black, to provide for full colour printing. Alternatively, or in addition, infra-red ink may be provided. The ink cartridge 32 supplies ink to the ink distribution channels of the printhead module 30 through an ink connector 33.

Any one of a number of known printhead modules and ink supply systems may be suitable for use with the present invention and thus further description of such features is omitted here. Details of printhead modules and ink supply systems suitable for use with the invention can be found in the above-mentioned co-pending applications of the present applicant.

A print controller 36 includes a microprocessor that converts image data stored in microprocessor memory into a sequence of electrical "drop ejection" signals. The signals are communicated to the printhead module 30 in a known manner during a print operation to cause selective ejection of ink from the ink ejection nozzles 31.

The print control microprocessor 36 communicates with the circuitry of the PCB 312 to receive print instructions and digital image data.

When the printer unit 10 is properly engaged in the mobile telephone 100, power contacts of the printer unit (not shown) connect with the power supply circuits of the mobile telephone.

As illustrated in FIG. 3, the end cap 13 is removable from the printer 10 to reveal an aperture 47 through which the ink cartridge may be replaced.

To perform printing, a user commands the printer using the navigation keys 102 and actuates the capper 50, in a manner described below, to expose the printhead chip 30 (FIG. 4) to the print media. The print media may be any suitable textile for receiving the type of ink stored in the printer and may include inter alia paper, cardboard, wood, fabric and plastics. The telephone 100 may include a control button depressed by the user to initiate printing (that is, to commence the ejection of ink from the printhead under the control of the print control microprocessor.) Alternatively, actuation of the capper 16 may be detected as a signal that the user is ready for the printing to commence. The user then traverses the print media 20 with the telephone 100 as illustrated in FIG. 1.

To control the printing rate, the printer 10 includes an optical encoder wheel 39 (FIG. 2) attached to the printhead module 30 at one end thereof. The optical encoder wheel 39 is received in slots 41a, 41b formed in the upper and lower mouldings respectively and extends from the mouldings to the point where the rim of the wheel 39 is level with the media slides 14 (see FIG. 4). Circumferentially spaced markings on the optical encoder wheel 39 are read by an optical sensor on the microprocessor 36 as the wheel 39 rotates in contact with the print media.

The optical sensor includes a light source, such as an LED, and a photo-detector that produces an electrical response dependent upon the amount of light incident upon the detector. The light reflection characteristics of the encoder wheel 39 vary between the marked and un-marked areas and thus as the markings rotate past the detector, a change in the detector response occurs. The frequency at which the detector response changes provides a measurement of the speed at which the encoder wheel is rotating and therefore the speed at which the telephone is moving relative to the print media.

The detector response is communicated to the print control microprocessor 36 which uses the signal to calculate the speed at which the printhead module is being moved across the print media. The print controller then synchronises the rate at which the drop ejection control signals are passed to the ink ejection nozzles with the measured speed of the printer. The printer 10 is therefore able to ensure appropriate print dot spacing of successive lines of print and thus create a faithful reproduction of the printed image even though the printer does not control the speed at which the print media moves relative to the printhead.

Furthermore, if the number of markings on the encoder wheel 39 is high enough, the microprocessor 36 is able to quickly adapt to the variations in the speed at which a user may move the printer across the print media thereby achieving a higher quality image.

An idler wheel 44 is attached to the opposite end of the printhead module 30 to allow stability and directional control of the printer. A shaft may connect the idler wheel 44 with the encoder wheel 39 to synchronise the rotation speeds of each wheel.

The optical encoder wheel 39 and/or idler wheel 44 may have a speed limiter such as a friction clutch that prevents a user from moving the printer along the print media at a rate faster than the maximum rate of operation of the printhead module 30. Furthermore, either or both wheels may have a system such as a ratchet for preventing the printer from being moved in a direction opposite to the direction of printing.

In the embodiment shown, digital image data may be provided to the microprocessor 36 from an external image source via a wireless telecommunications network and received via the antenna 315 and PCB 312.

Alternatively, the digital image data may be received from an external device such as a computer using an infra-red (IR) signal transmitted through an IR window formed in the casing of the mobile telephone. In such an embodiment an IR receiver electrically connected to the microprocessor 36 receives the data which is then stored in the processor memory. In alternative embodiments (not shown), the microprocessor may communicate through any other suitable connection for example, hard wire connections to other electronic devices (such as computers, scanners, copiers, digital cameras), wireless telecommunications (such as WAP) or through a plug and socket connection or data port. Other information, for example print control instructions, may also be provided to the printer from external devices using the above systems. In a further embodiment, the microprocessor may have its own graphics generating capabilities.

Figure 8:
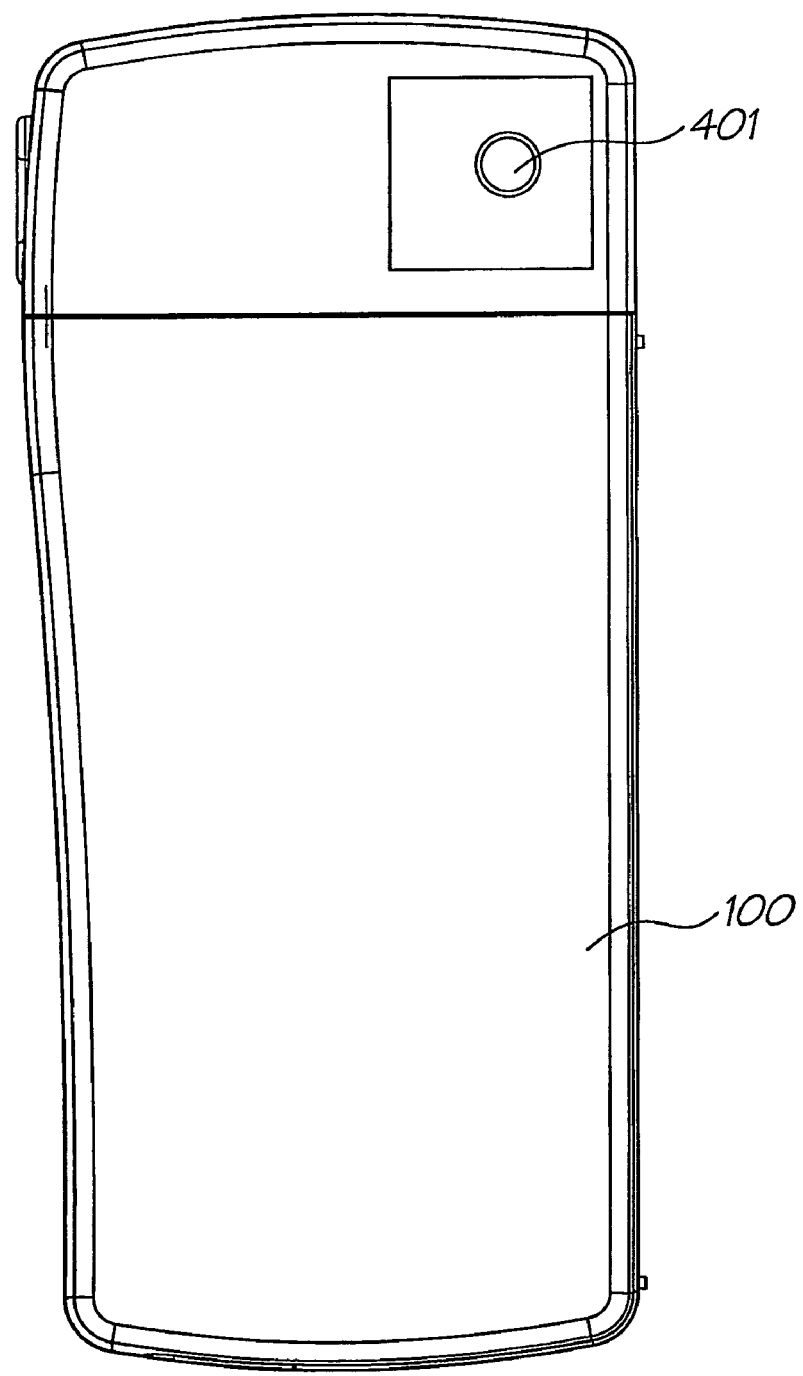
FIG. 8 is a rear elevational view of a mobile telephone with an in-built digital camera.

For example, as depicted in FIG. 8, the mobile telephone 100 may have an in-built camera module. In this embodiment, a lens 401 is formed in the base moulding 302. Light passing through the lens 401 is incident on a CCD array. The CCD array communicates a digital image to the print control microprocessor for printing. Camera operation keys are incorporated into the keypad 102 of the telephone.

In the embodiment described herein, the printer unit 10 includes a replaceable ink cartridge. As an alternative, the mobile telephone 100 may be provided with an integral ink reservoir that is re-charged with ink from an ink charging stand using an ink charging system, further details of which are provided in the present applicant's co-pending application Ser. Nos. 10/943,289 and 10/943,939 cross-referenced above. An ink charging system of the type referred to above utilses ink inlets 327 of the print unit 10 as seen in FIGS. 5 and 7. By using an ink charging system of the type referred to, the printer unit 10 need not be as readily removable as would otherwise be necessary because removal of the printer unit 10 will only be required for maintenance of the printhead.

Figure 12:
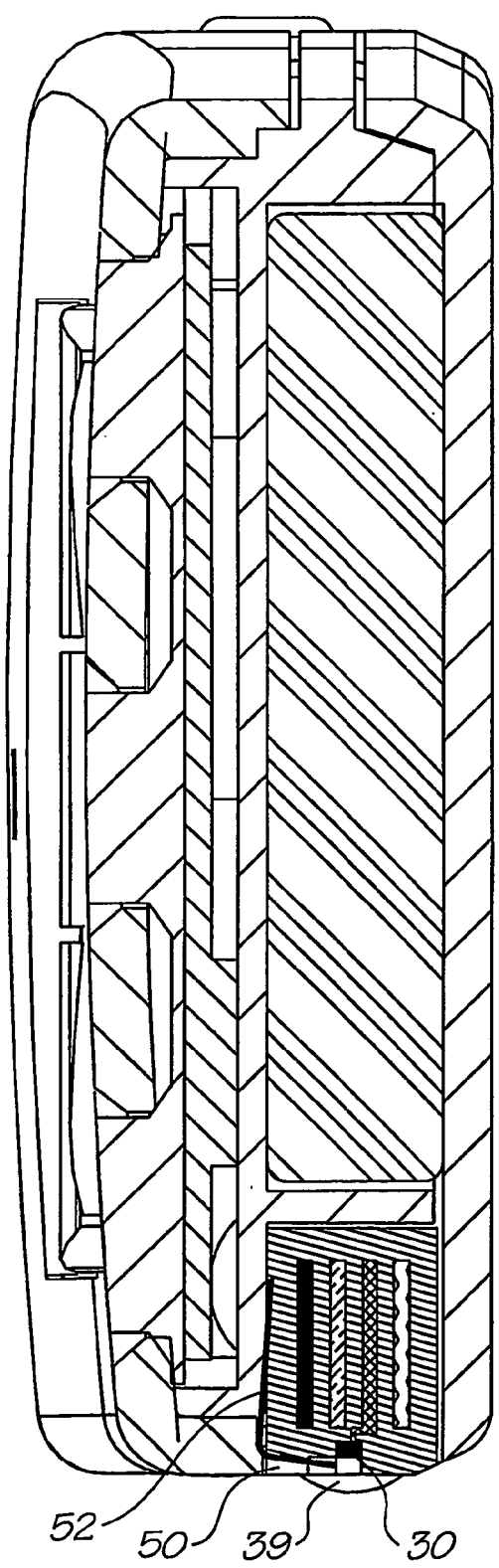
FIG. 12 is a transverse cross-section of the mobile telephone of FIG. 5.

FIG. 12 is a transverse cross section of the mobile telephone 100 of FIG. 5. In this figure, there is shown a capping mechanism 50 of the type described in the present applicant's co-pending application Ser. No. 10/361,728 cross-referenced above. The capping mechanism is mounted on the printer unit 10 in a manner that allows movement of a capping arm 52 from a position in which the capping arm 52 obstructs the ejection of ink from the printhead chip 30 to a position as illustrated where ejection of ink from the printhead chip 30 is uninhibited.

Actuation of the capping mechanism 50 to its uncapped position can occur in any suitable manner, including but not limited to those examples described in the applicant's co-pending application Ser. No. 10/361,728 cross-referenced above. For example, actuation of the capper may occur using a friction clutch operating in conjunction with the encoder wheel 39, a solenoid actuator, or a finger-operated actuator exposed through the casing of the mobile telephone 100.

The configuration of the printhead module and ink reservoir within the telephone casing may be varied to suit the particular model and styling of the telephone. The embodiments described previously utilise a side-edge printhead with an integral recharging ink reservoir.

Alternative embodiments include configurations where the printhead is exposed through a bottom or top edge of the telephone casing and has either integral or replaceable ink cartridges as required.

While the invention has been described with particular reference to mobile telephones, it will be apparent to the person skilled in the art that the invention is suitable for application in many other portable electronic devices, including but not limited to, Wireless Internet Access Devices (WIADs) in particular Wireless Application Protocol (WAP) terminals, pagers, Personal Digital Assistants (PDAs) and the like.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A mobile telecommunications device comprising a casing, a display, circuitry for wireless telecommunications housed within the casing and a printer housed within the casing, the printer comprising:
    a printhead arrangement adapted to effect printing onto print media as the printer is moved relative to the print media, the printhead arrangement including a plurality of ink ejection nozzles;
    an ink supply adapted to store ink and to supply the ink to the printhead arrangement;
    a speed sensor adapted to measure the speed at which the printhead arrangement is moved relative to the print media and to generate speed data; and
    a print controller adapted to:
    (a) receive image data from an image source;
    (b) convert the image data into a plurality of drop ejection control signals;

(c) receive the speed data from the speed sensor; and
(d) operate the ink injection nozzles in the printhead arrangement in accordance with the drop ejection control signals at a rate determined using the speed data, to thereby effect printing of the image data onto the print media wherein the speed sensor comprises:

an optical encoder wheel adapted to be in contact with the print media and to rotate as the device is moved relative to the print media, the optical encoder wheel having a series of circumferentially spaced markings thereon; and an optical sensor adapted to:
(a) detect the markings as the markings pass the optical sensor during rotation of the optical encoder wheel; and
(b) generate the speed date from the detected markings;

the mobile telecommunications device further comprising a capping arrangement moveable between a capped position in which the capping arrangement substantially obstructs the ejection of ink from the ink ejection nozzles and a un-capped position in which the capping arrangement does not substantially obstruct the ejection of ink from the ink ejection nozzles, the capping arrangement being actuated by a capping actuator disposed on the device so as to be operable by a user as the user moves the printhead arrangement relative to the print media.

2. The device of claim 1 wherein the ink supply is removable from the printer.

3. The device of claim 1 wherein the image data is received at the circuitry for wireless telecommunications from a wireless telecommunications network.

4. The device of claim 1 wherein the printer further comprises a replaceable ink cartridge.

5. The device of claim 1 further comprising one or more ink inlets through which the ink supply may be replenished.

6. The device of claim 1 further comprising a digital camera including a lens and CCD array, and wherein image data captured by the CCD array is displayed on the display of the telecommunications device.

7. The device of claim 6 wherein the printer is adapted to print images captured by the digital camera.

8. The device of claim 1 wherein the print controller receives the image data from the image source via the circuitry for wireless telecommunications.

* * * * *